Jan. 15, 1952 W. HORODECK 2,582,333
MULTIPORT ROTARY DISK VALVE
Filed April 17, 1948 4 Sheets-Sheet 1
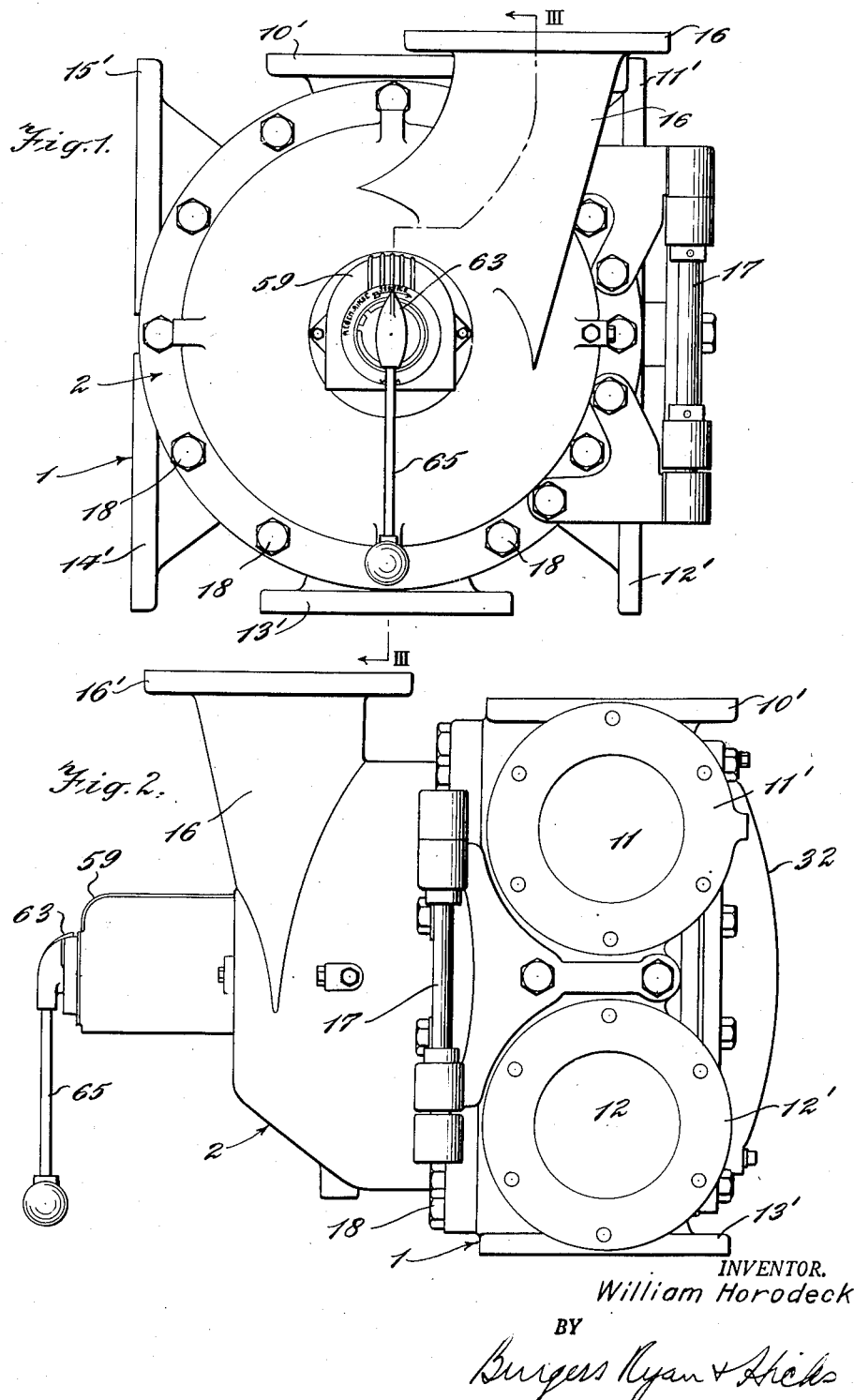
INVENTOR.
William Horodeck
BY
Burgess Ryan & Hicks
ATTORNEYS

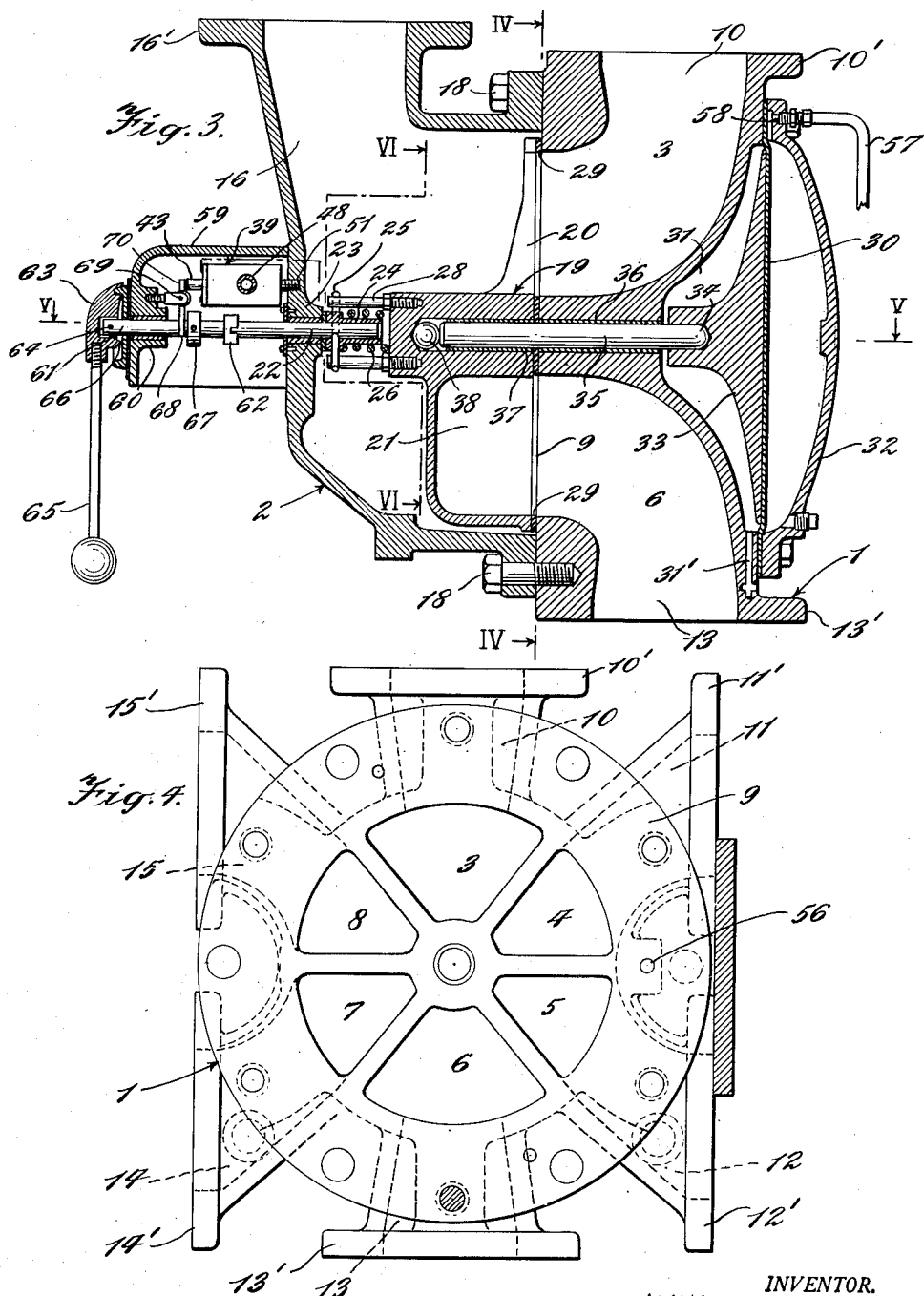

Jan. 15, 1952  W. HORODECK  2,582,333
MULTIPORT ROTARY DISK VALVE
Filed April 17, 1948  4 Sheets-Sheet 3

INVENTOR.
William Horodeck
BY
Burgess Ryan & Hicks
ATTORNEYS

Jan. 15, 1952 W. HORODECK 2,582,333
MULTIPORT ROTARY DISK VALVE
Filed April 17, 1948 4 Sheets-Sheet 4
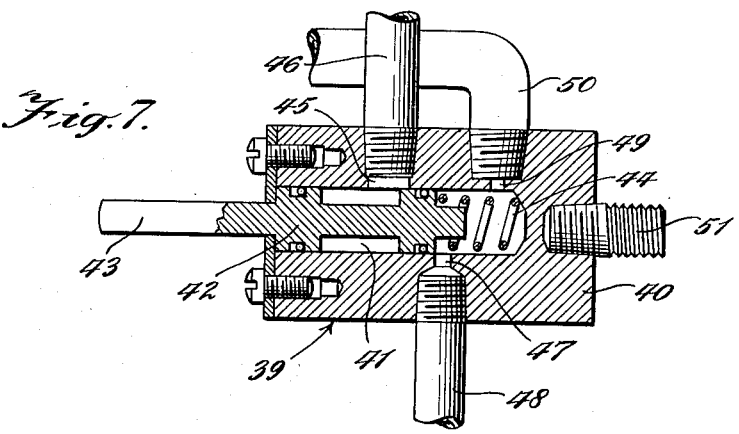
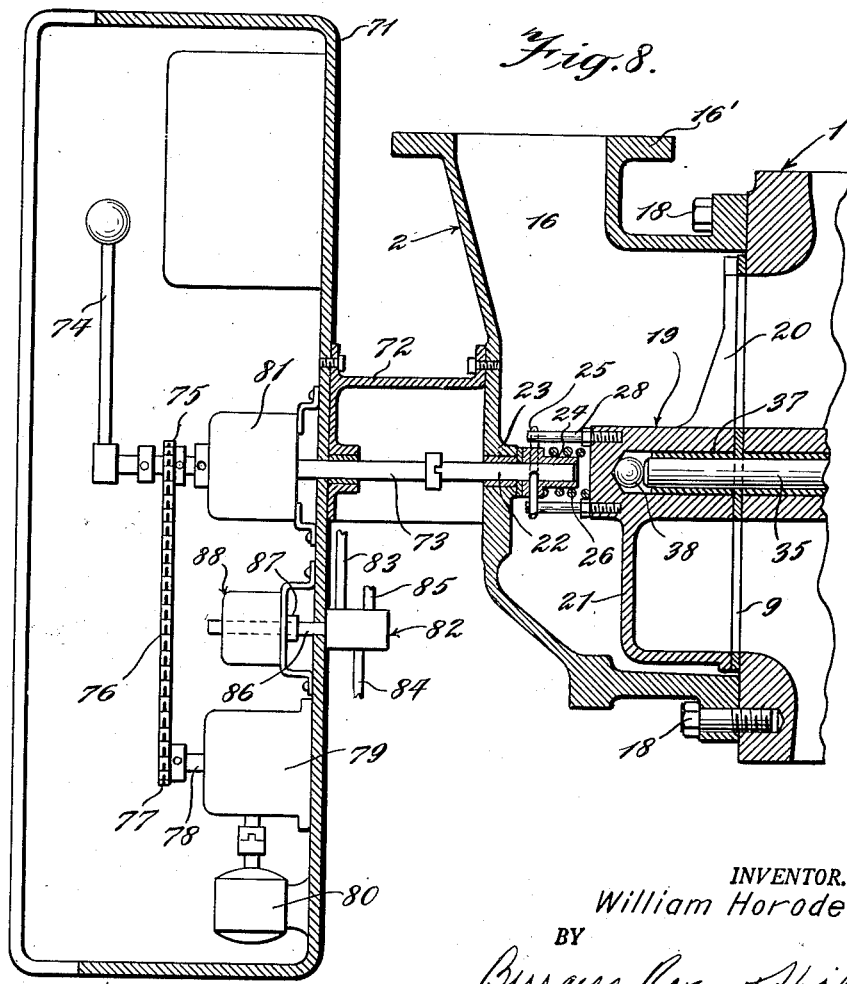
INVENTOR.
William Horodeck
BY
Burgess Ryan & Hicks
ATTORNEYS Patented Jan. 15, 1952

2,582,333

UNITED STATES PATENT OFFICE 2,582,333

MULTIPORT ROTARY DISK VALVE

William Horodeck, Elmhurst, N. Y., assignor, by mesne assignments, to Cochrane Corporation, Philadelphia, Pa., a corporation of Pennsylvania Application April 17, 1948, Serial No. 21,650

5 Claims. (Cl. 137—139)

This invention relates to valves of the kind especially suitable for variously controlling the flow paths of liquid in the operation of sundry types of apparatus, such as sand filters, ion exchange equipment and the like. More specifically, the invention is concerned with so-called multiport valves of the rotary type and it is illustrated and described herein, by way of example, in a preferred form appropriate for a zeolite water softening system.

In such a system, the rotor or valve proper, normally occupies a "service" position, the entering hard water then being directed through the softener unit and discharged to a soft water outlet. When necessary to regenerate or restore the bed in the softener unit, the rotor is successively moved to backwashing, regenerant introduction and rinsing positions, at each of which the liquid flow is appropriately directed to effect the various indicated operations, as is well understood. Thereafter, the rotor is returned to its normal or service position.

Among the outstanding difficulties which have long persisted in the construction and operation of such multiport valves of the rotary type may be mentioned the problem of leakage at the rotor seat, due to initial or subsequently developing imperfections in the mating of the surfaces due to warpage or scoring or other wear (aggravated by the high pressure with which the rotor normally bears against its seat). Another outstanding problem, stemming from the seating pressures, is that of the power required to turn the rotor. In the latter connection, power drives (as by electric motors) have been employed but the known valve constructions have been such as to require motors of relatively large horse power and drive mechanism; and, due to the wide pressure and load variations encountered in different sizes of valve installations, a great variety of sizes and types of motor has been required.

The primary object of the present invention is a valve construction which avoids the difficulties above mentioned and is so organized that the rotor can be manipulated with the utmost ease, manually, or, when motor driven and even in large valve sizes, can be rotated by a standard, fractional horsepower motor operable from the usual 110 volt lighting circuit. This not only permits the use of a relatively light transmission but also makes possible the use of a single, standard reduction gearing, between the motor and rotor, suitable for all valve sizes. Furthermore, the fractional horsepower motors permissible to be used require no special relay controls for starting and stopping.

With such object in view, and others hereinafter indicated, the invention comprises the claimed combinations and arrangements below described and exemplified in the accompanying drawings in preferred form.

In the drawings:

Fig. 1 is a front elevation of such preferred form of valve arranged for manual operation;

Fig. 2 is a side elevation (right hand side as viewed in Fig. 1);

Fig. 3 is a section on the line III—III of Fig. 1;

Fig. 4 is a section on the line IV—IV of Fig. 3;

Fig. 7 is an enlarged scale view of a valve detail; and

Fig. 8 is a vertical section, largely diagrammatic, of a portion of the valve arranged for motor operation.

Figure 5:
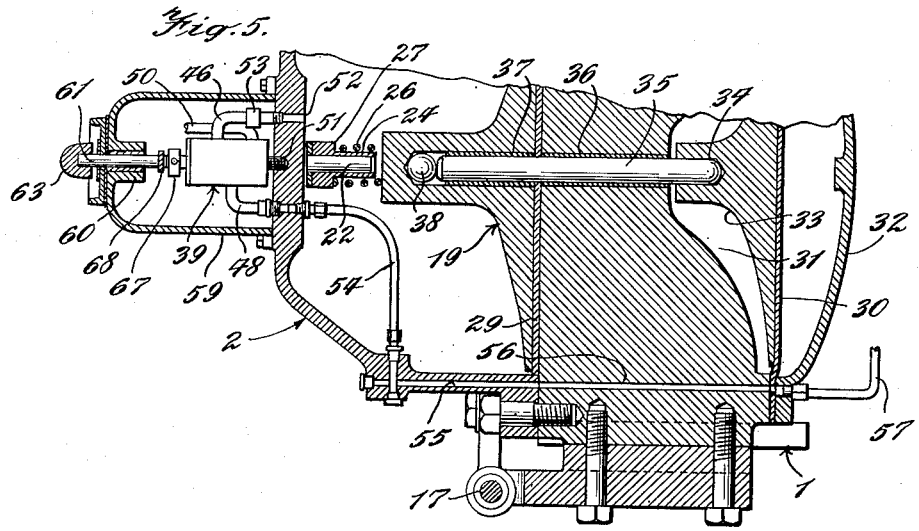
Fig. 5 is a section on the line V—V of Fig. 3.
Figure 6:
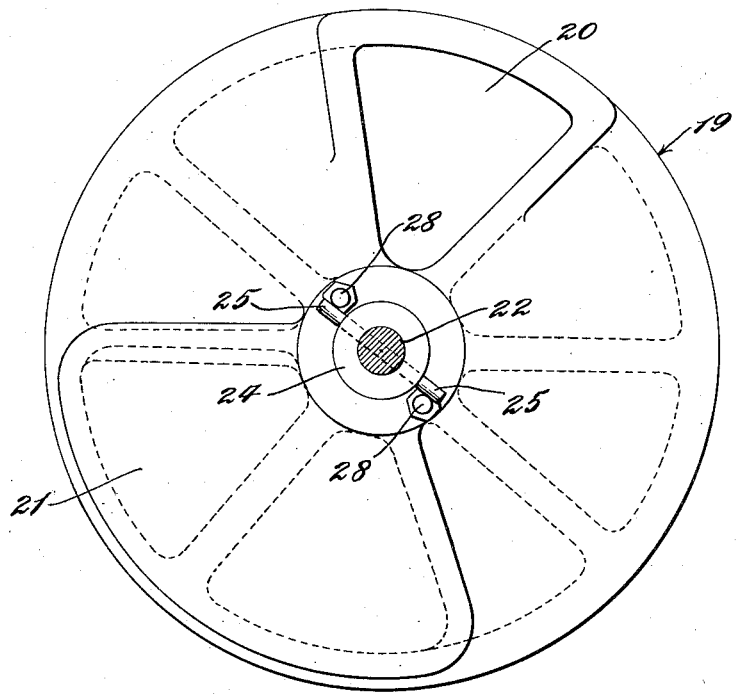
Fig. 6 is a sectional view, as on the line VI—VI of Fig. 3, but omitting the structure back of the valve rotor.

The valve structure consists of two main elements, a body 1 and a housing 2.

The valve body incorporates a series of chambers or passages 3, 4, 5, 6, 7, 8, all opening into the front face 9 of the body at what, for convenience, may be termed the chamber "inlets," although, as will be understood, whether they happen to be functioning as entrances or exits depends upon the position of the rotor. The chambers also communicate, respectively, with "outlet" ports 10, 11, 12, 13, 14, 15. Each of the outlet ports is surrounded by a coupling flange (designated by corresponding primed references) for connection with the various pipe lines (not shown). For present purposes, it is unnecessary to describe such lines or their several destinations.

In the particular valve structure illustrated, the housing 2 constitutes what may be called an inlet housing in that, instead of serving simply as a cover for the valve rotor, it incorporates an inlet port 16, flanged as at 16', for connection to the hard water supply line. As shown more particularly in Figs. 1 and 2, the inlet housing is hinge supported on the front of body 1, as by a post 17 and is suitably secured, as by bolts 18.

Within the inlet housing is a valve rotor 19 mounted for rotation about a horizontal axis and comprising essentially a plate having an aperture 20 adapted to register with one or another of the body chamber inlets and incorporating also a transfer cavity 21 adapted to overlie and provide communication between adjacent body chamber inlets.

The rotor is rotatable by a valve shaft 22 which is journaled in a bushing carried by a boss 23 projecting inwardly from the front wall of the inlet housing. Shaft 22 may be rotated by power or otherwise but, in this instance, is shown arranged for manual rotation, as below described.

According to the present invention, a yielding coupling is provided between the valve shaft and the rotor so that while the shaft remains at rest, the rotor may move axially relatively to it.

As illustrated more particularly in Figs. 3 and 5, the inner end of shaft 22 carries a shouldered sleeve 24 which is secured to the shaft, as by pin 25, and which serves as a guide for a spring 26. At its outer end, the spring bears against the guide shoulder 27 and, at its inner end, abuts the face of the hub portion of rotor 19. Rotation of the valve shaft is applied to turn the rotor by the engagement of the projecting ends of pin 25 with studs 28 mounted in and projecting forwardly from the rotor hub.

To insure a tight seal between the rotor and the front face of the valve body, there is interposed between them a facing of material 29, such as soft rubber, which may be secured to the rotor. As will be understood, the rotor is held in sealing engagement with the body by a combination of the pressure of spring 26 and the excess of the liquid pressure on the front of the rotor over whatever pressure may be exerted against the rear of the rotor.

Free turning of the rotor is secured by the provision of means for unseating it prior to turning; that is to say, for moving the rotor in a direction away from the body face, axially of the shaft, at least far enough to relieve the mating faces of any such drag as would injure the rubber facing or offer any appreciable opposition to the turning force; and, according to the present invention, provision is made for unseating the rotor by power means arranged to hold the rotor unseated while it is being turned and, under appropriate control, to restore it to its seating position after it has taken up its new position. As presently described, the reseating of the rotor is so effected that, without conscious attention by the operator, it takes place gently or without any destructive hammer.

For these purposes, a magnetic or other "fluid" operated motor device is provided having a connection to the rotor so that when the motor device is energized, it unseats the rotor and, when deenergized, permits it to seat again. Preferably, the motor device is hydraulically operated and, as in the preferred form illustrated, includes a pressure chamber associated with the valve structure, a pressure sensitive member movable in the pressure chamber and means for controlling the application and relief of the fluid pressure to move the pressure-sensitive member to effect the described unseating and reseating of the rotor.

The illustrated motor device is pressure liquid operated and comprises a diaphragm 30 located in a pressure chamber at the rear of the valve body. The rear face of the body is dished, as at 31, and the diaphragm is held distended across this dished portion and clamped by cover plate 32 which is bolted to the body. The diaphragm rests against a plate 33, which has a short central bore to accommodate one end of an actuating rod 35, which latter is a sliding fit in a bushing 36 which extends through the central or hub portion of the body around which the chambers are arranged. At its forward end, rod 35 extends into a bushing 37 in the central or hub portion of the rotor and bears against a ball 38. It will thus be apparent that movement of the diaphragm and its backing plate forwardly, or to the left as viewed in Fig. 3, is transmitted by rod 35 to the rotor to unseat the latter, return movement of the diaphragm permitting the rotor to reseat. It will be recognized that, while unseated, the rotor turns about the single, central, ball support and that, in consequence, frictional resistance to its rotation is at a minimum; also that, at all times, the rotor is held against cocking by the forward extension of rod 35.

To effect the described movement of the diaphragm, it is preferred to utilize the pressure of the liquid on the high pressure side of the valve and this is conveniently accomplished by means of a controlled conduit or flow passage extending from the inlet housing to the chamber between the diaphragm and cover 32. After the rotor has been turned to its new setting, the pressure acting on the diaphragm to hold the rotor unseated is relieved, as by shutting off the supply of liquid under pressure to the diaphragm chamber and permitting the excess liquid in the chamber to escape to any convenient point of disposal.

In Fig. 7 is illustrated a valve suitable for controlling the liquid flow to the diaphragm chamber and for venting that chamber, as just described. This valve, generally designated 39, comprises a block 40 bored to provide a cylinder 41 for a piston 42. The piston has a projecting stem 43 and is normally biased to the position illustrated by spring 44. The cylinder bore has an inlet 45 which may be supplied with high pressure liquid by way of tube 46. Outlet 47 is connected by tube 48 with the chamber between the diaphragm and cover 32 and outlet 49 is connected by tube 50 to waste. It will be observed that in the position illustrated, the piston blocks the passage of liquid entering by way of tube 46, but when pressure is applied to stem 43 and the piston is moved to the right, the entering liquid is permitted to pass out through tube 48. When stem 43 is released and the piston returned by spring 44, tube 48 is connected to waste outlet tube 50.

Reverting now to Figs. 3 and 5, it will be seen that valve 39 is mounted on the front wall of the inlet housing, as by nipple 51, and that the liquid inlet tube 46 is connected to the interior of the inlet housing by way of hole 52. A check valve 53 is indicated in Fig. 5, which valve is arranged to open in the direction of flow toward valve 39. Tube 48 is connected by way of tube 54 with a bore 55 in the wall of the inlet housing. An aligned bore 56 extends from front to rear through the valve body between two of the chambers to conduct the liquid to the diaphragm chamber. For convenience of illustration, the connection from bore 56 to the diaphragm chamber is shown as consisting of a tube 57 carried outside of the valve body to a point of admission 58 (Fig. 3) at the top of the diaphragm chamber. As will be understood, this top connection serves to avoid the draining of the diaphragm chamber each time it is vented, that is, when piston 42 is in the position shown in Fig. 7. Waste outlet 49 or tube 50 is suitably dimensioned to retard the escape of liquid from the diaphragm chamber and thereby cushion the reseating of the rotor. In the illustrated form, the outlet 49 is shown restricted. As indicated in Fig. 3, the dished section 31 is vented, as at 31', to maintain at atmospheric the pressure opposing movement of the diaphragm.

It will be recognized that the controls for valve stem 43 and valve shaft 22 can be variously organized to suit the required type of system controls.

As shown in the figures above described, a control cover 59 is secured to the front wall of the inlet housing and, in its own front wall, is provided a boss 60 which affords journal support for a shaft 61 which has a transverse key and slot connection 62 with valve shaft 22, the latter connection being sufficiently deep to insure that the two shafts are coupled together at all times. On the outer or free end of shaft 61, a pointer 63 is pivoted at 64 and from the pointer depends an operating handle 65. On the back of the pointer is a projection 66 which serves as a fulcrum about which the pointer may rock when the handle is pressed inwardly, that is, toward the valve structure, which movement of the handle and rocking of the pointer serves to draw shaft 61 slightly outwardly, or to the left as viewed in Fig. 3. Adjustably secured to shaft 61 is a collar 67 and immediately in front of the collar is a yoke 68, pivotally supported at 69 and having an upper extension 70 overlying the end of valve stem 43.

It will thus be apparent that whenever it is desired to move the rotor to a new setting, handle 65 is pushed inwardly and then turned. The inward movement serves to operate valve 39, thereby actuating the diaphragm and unseating the rotor and holding it unseated while the rotor is being turned by the coupled shafts 61 and 22. When the new setting is reached and handle 65 is released, valve 39 assumes a position which permits the pressure on the diaphragm to be relieved through waste tube 50 and the rotor to be reseated.

By way of further example, Fig. 8 illustrates dagrammatically an adaptation of the valve for motor operation of the rotor.

In this example, a control box 71 is carried by a support 72 secured to the front wall of the inlet housing, which box serves to house all the controls necessary for motor operation of the valve, including a suitable motor. As will be understood, such an arrangement is made feasible by the fact that only a small, fractional horsepower motor is required, due to the ease with which the rotor can be turned after it has been unseated in the manner described.

As illustrated in Fig. 8, shaft 22 is coupled to a shaft 73 which projects into the control box and carries on its forward end a handle 74 which can be used to turn the rotor in the event of power failure. A sprocket 75 is secured to shaft 73 and is connected by chain 76 with a sprocket 77 secured to the outer end of shaft 78 of a speed reducer 79 driven by motor 80. Reference character 81 indicates a positioning contactor which forms no part of the present invention and which need not be described.

Mounted on the back of the control box is a valve 82, which may be of the same construction as valve 39 and provided with tubes 83, 84 and 85 for connection respectively to the inlet housing, to the diaphragm chamber and to waste. As with valve 39, valve 82 has a forwardly projecting actuating stem 86 which, in this instance, is shown abutting the armature 87 of a solenoid 88, the arrangement being such that when the solenoid is energized, its armature moves stem 86 to the right as viewed in Fig. 8 to operate the valve and effect the actuation of the diaphragm.

When equipped with controls of this character, the setting of the rotor is changed by first energizing solenoid 88 to cause the rotor to be unseated and then energizing motor 80 to turn the rotor. At the new setting of the rotor, the motor is stopped (as by circuit controls forming no part of the present invention) and solenoid 88 is de-energized to permit valve 82 to return, the diaphragm chamber to be vented and the rotor to be reseated, all as above described with reference to manual operation.

While the above description applies to the presently preferred form of the valve, as adapted for manual and automatic control, it will be recognized that the principles of the invention may be variously applied to other equivalent mechanisms and otherwise arranged, as the necessities of other particular systems may require.

In the light of the foregoing, the following is claimed:

1. In a multiport valve, the combination with a structure incorporating a multi-chambered body having chamber inlets in one face of the body, a housing overlying such face and a valve rotor in the housing rotatable to different positions to variously control communication between the chamber inlets, of an inlet to said housing to receive liquid under pressure independently of said body chambers, a rotor-operating shaft journaled in said housing, means for holding the shaft against endwise movement, means for rotating said shaft, an axially yieldable coupling between the shaft and rotor, a pressure chamber associated with the face of the body remote from the chamber inlets, a pressure-sensitive member movable in the pressure chamber in the direction of the shaft and rotor axis, conduit means for conducting liquid from the inlet housing side of the valve to the top of said chamber to actuate said member, and rotor-unseating connecting means extending from said member, through the body, to the rotor, adapted to move the rotor axially relatively to its said operating shaft in a direction to unseat the rotor in response to movement of said member.

2. In a multiport valve, the combination with a structure incorporating a multi-chambered body having chamber inlets in one face of the body, a housing overlying such face and a valve rotor in the housing rotatable to different positions to variously control communication between the chamber inlets, of an inlet to said housing to receive liquids under pressure independently of said body chambers, a rotor-operating shaft journaled in said housing, means for holding the shaft against endwise movement, means for rotating said shaft, an axially yieldable coupling between the shaft and rotor, a pressure chamber associated with said structure, a pressure-sensitive member movable in the pressure chamber in the direction of the shaft and rotor axis, conduit means for conducting liquid from the inlet housing side of the valve to said chamber to actuate said member, and rotor-unseating connecting means between said member and the rotor adapted to move the rotor axially relatively to its said operating shaft in a direction to unseat the rotor in response to movement of said member.

3. In a multiport valve, the combination with a structure incorporating a multi-chambered body having chamber inlets in one face of the body, a housing overlying such face and a valve rotor in the housing rotatable to different positions to variously control communication between the chamber inlets, said rotor being axially movable to unseat it and thereby free it for rotation, of an inlet to said housing to receive liquid under pressure independently of said body chambers, a pressure chamber associated with the face of the body remote from the chamber inlets, a pressure-sensitive member movable in the pressure chamber in the direction of the rotor axis, conduit means for conducting liquid from the inlet housing side of the valve to said chamber to actuate said member, rotor-unseating connecting means extending from said member, through the body, to the rotor, adapted to unseat the rotor in response to movement of said member and means for rotating the rotor.

4. In a multiport valve of the kind comprising a structure incorporating a multi-chambered body having chamber inlets in one face of the body, a housing having an inlet overlying such face, a valve rotor in the housing and a shaft rotatable to rotate the rotor to different positions to variously control communication between the chamber inlets and having an axially movable connection relative to said rotor, said rotor being axially movable to unseat it and thereby free it for rotation, the improvement which comprises a pressure chamber associated with the face of the body remote from the chamber inlets, a pressure-sensitive member movable in the pressure chamber in the direction of the rotor axis, means for applying fluid pressure to actuate said member, and rotor-unseating connecting means extending from said member, through the body, to the rotor, adapted to move the rotor axially relatively to its said shaft in a direction to unseat the rotor in response to movement of said member.

5. In a multiport valve, the combination with a structure incorporating a body having a series of chambers arranged about a central hub portion of the body and having inlets opening into one face of the body, a housing on the body having an inlet and a valve rotor in the housing rotatable to different positions to variously control the chamber inlets, said rotor being axially movable to unseat it and thereby free it for rotation, of a shaft journaled in the housing and reciprocably coupled relative to the rotor but rotatable therewith, a motor device mounted on the face of the body remote from the chamber inlets, an actuating member mounted in the hub portion of the body with freedom for endwise movement in the direction of the axis of the rotor, said member extending from the motor device to the rotor whereby said motor device can unseat and free said rotor for rotation and means for rotating the shaft and thereby the rotor.

WILLIAM HORODECK.

REFERENCES CITED

The following references are of record in the file of this patent:

UNITED STATES PATENTS

| Number | Name | Date |
|---|---|---|
| 661,200 | Wehinger | Nov. 6, 1900 |
| 1,291,609 | Nichols | Jan. 14, 1919 |
| 1,842,382 | Arey | Jan. 26, 1932 |
| 2,085,688 | Schuchman | June 29, 1937 |
| 2,087,296 | Parsons | July 20, 1937 |
| 2,326,686 | Rutledge | Aug. 10, 1943 |